3,671,196
APPARATUS FOR A QUANTITATIVE ANALYSIS OF A GAS OR GAS MIXTURE IN RESPECT OF ITS CONTENT OF ORGANIC SUBSTANCES
Arnold Brantte, Hasselstigen 4, Solna, Sweden; Bengt Harald Ivar Frostling, Kruthornsvagen 32A, Sollentuna, Sweden; and Per-Henning Lindgren, Ringgatan 20C, Uppsala, Sweden
Filed Nov. 10, 1969, Ser. No. 875,095
Claims priority, application Sweden, Nov. 14, 1968, 15,440/68
Int. Cl. G01n 27/62, 31/12
U.S. Cl. 23—254 R
5 Claims

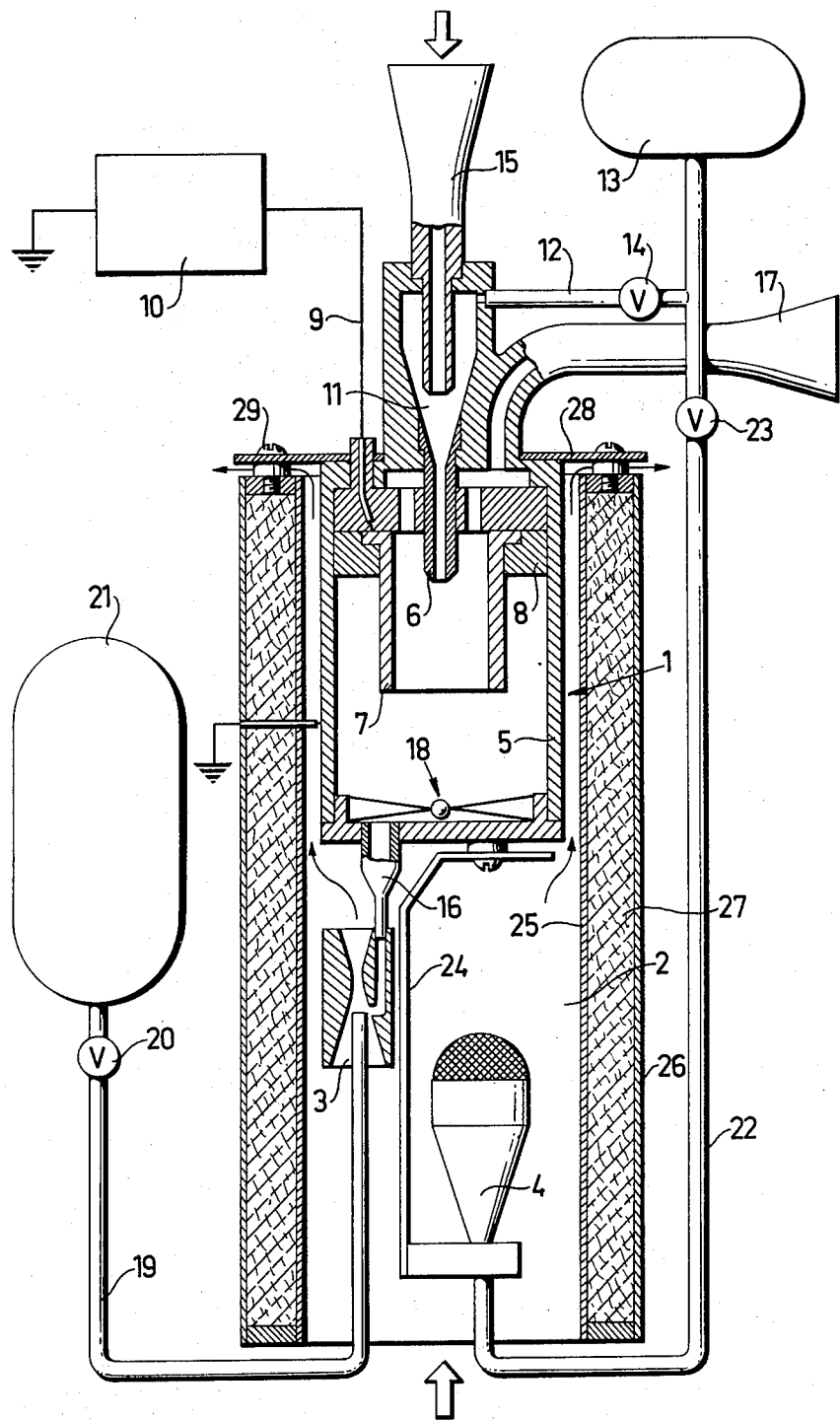

ABSTRACT OF THE DISCLOSURE

An apparatus for analyzing gas comprising an ionization detector, a gas ejector for sucking gas through said ionization detector, and a catalytic gas burner for supplying heat to the chamber surrounding said detector and ejector.

The present invention relates to an apparatus for a quantitative analysis of a gas or gas mixture in respect of its content of organic substances. Said substances may be contained in the analysed gas as hydrocarbon compounds in gaseous or particle form. In the latter case, i.e. when the organic substances in the analysed gas have the form of liquid or solid particles, said particles will form an aerosol with said gas.

More particularly, the invention has for its object to provide an analysis apparatus of the kind comprising an ionization detector, a suction pump connected to the outlet of the detector and arranged to establish a vacuum in the detector and to cause a flow of gas therethrough, and a heater arranged to maintain the ambient temperature of the suction pump and the detector at a suitable value.

The reason for causing the gas flow through the ionization detector by means of a suction pump connected to the outlet of the detector, instead of using a pressure pump connected to the inlet of the detector, is that it is possible hereby to eliminate the disadvantage of the latter pump arrangement which consists in that gaseous hydrocarbon compounds as well as such compounds in the form of liquid or solid particles are extensively deposited in the pump and the inlet passage to the detector thereby causing false and non-reproduceable test results. This drawback of an analysis apparatus having a pressure pump in the inlet of the detector is especially troublesome if the organic substances contained in the analysed gas have the form of liquid or solid particles. Consequently, on the whole an analysis apparatus of said sort cannot be used for determining the amount of hydrocarbon compounds in aerosol form. If, as is the case in analysis apparatus according to the invention, the gas flow through the detector is instead obtained by means of a suction pump connected to the outlet of the detector, it is possible to design the inlet to the detector in such a way that the risk for depositions of organic substances in the inlet can be reduced to a minimum.

In this connection is should be mentioned that an ionization detector bases its function on the well-known fact that organic substances can be brought to form ions which if said substances are contained in a carrier gas of a suitable kind can make said gas electrically conductive. The concentration of organic substances in the analysed gas or gas mixture can thus be determined by measuring the electric conductivity of the gas contained in the detector. The ionization in the detector is preferably obtained by supplying to the detector a combustible gas which during the combustion thereof produces a sufficient heat for causing the desired ionization. Naturally, a detector in which the ionization is caused through gas combustion also must be supplied with the necessary oxygen for the combustion. Preferably this is obtained through supplying air to the detector.

The purpose of the heater contained in the apparatus is on the one hand to maintain the ambient temperature of the suction pump and the detector at such a value that stable temperature conditions can be obtained in the detector, and on the other hand to eliminate the risk for condensation in the pump or in the detector in case the detector is a heat ionization detector.

In known apparatuses of the kind described the suction pump has been an electric pump and the heater has been an electric heater. However, the use of such a pump and such a heater is disadvantageous in several respects. Since said devices require electric energy for their function it is either necessary to design the apparatus for connection to an electric distribution network or to equip the apparatus with large and heavy electric accumulators. Both these alternatives are, however, extremely unfavourable if the apparatus is intended for portable use. Moreover, since an electric suction pump always causes a pulsating gas flow through the detector the measurement accuracy of the apparatus will be restricted. The main object of the invention is to provide an analysis apparatus of the kind described in which the above mentioned drawbacks are eliminated.

An apparatus according to the invention is primarily characterized in that the suction pump is a gas ejector and that the heater consists of a catalytic gas burner.

By making the suction pump as well as the heater independent of electric energy and instead operated by gas one will obtain the essential advantage that the required energy for operating the pump and the heater can be supplied from small gas bottles which are built in in the apparatus. Thus, the apparatus can be made easily portable as it does not need to be connected to an electric main or to large and heavy electric accumulators. The use of a gas ejector as suction pump also involves the advantage that variations in the flow of the analysed gas through the detector can be avoided whereby the measurement accuracy is increased.

As mentioned above, the detector can suitably be arranged to be supplied with a combustible gas for producing the required heat for ionizing the analysed gas or gas mixture. The most well-known heat ionization detector is the flame ionization detector which utilizes flame combustion. This type of detector requires an igniter for starting the combustion in the detector. This igniter has previously been of an electric type, for instance in the form of an electrically heated resistance wire. However, it has been found that such igniters have the drawbacks that vacuum-tight terminals have to be provided in the walls of the detector and that the instrument used for measuring the ionization in the detector must be constantly observed so that if the flame in the detector should be blown out, for instance due to a rapid external pressure change, the combustion can be started again without delay.

According to the invention said drawbacks can be eliminated by using a catalytic igniter. Such an igniter does not only cause an automatic ignition at the beginning of a test period but does also ensure that the combustion will be automatically restarted if the flame should be blown out during the test.

In a preferred embodiment of the invention the gas ejector is arranged to be supplied with carbon dioxide as driving gas. This choice of driving gas makes it possible, on the one hand, to obtain an excellent pump function as the molecules of said gas are comparatively large and, on the other hand, to utilize a small supply container for the gas as the carbon dioxide can be compressed to liquid form. However, the pump can also be driven by other gases than carbon dioxide. For instance, one may use compressed air or nitrogen.

According to the invention the heater as well as the detector can be arranged to be supplied with hydrogen gas for combustion therein. Hereby one will obtain the advantage that both devices may be fed from a common gas container. However, the heater and the burner in the detector can both be supplied also with other combustible gases. One suitable alternative combustible gas is carbon monoxide.

Below the invention will be described in greater detail, reference being had to the accompanying diagrammatic drawing, showing, partly in section, an analysis apparatus according to one embodiment of the invention.

In the drawing reference numeral 1 designates a flame ionization detector disposed within a heat chamber 2 also containing a gas ejector 3 and a catalytic burner 4. Detector 1 has a generally circular cylindrical casing 5 the upper portion of which carries a burner nozzle 6 and a cylindrical collector electrode 7 into the upper end of which nozzle 6 projects with its lower end. The collector electrode 7, which is mounted in a two-piece electrically insulating block 8, is by means of a wire 9 connected to an instrument 10 for measuring the electric conductivity of the gas contained in the detector. As can be seen in the drawing, instrument 10 has its opposite pole connected to earth and thereby to the earthed casing 5 of the detector. Burner nozzle 6 terminates at its upper end in an enlarged chamber 11 to which is connected a conduit 12 for supplying hydrogen gas to chamber 11 and nozzle 6 from a hydrogen gas container 13. As appears from the drawing, a valve 14 is connected into conduit 12. In chamber 11 terminates also an inlet pipe 15 for the gas to be analysed in the detector. At its upper end pipe 15 has a flared conical entrance portion which has been designed so as to eliminate as far as possible the risk for deposition of organic substance in gas or particle form on its walls.

At its lower end detector 1 is provided with an outlet pipe 16 connected to the suction inlet of ejector 3. Moreover, the detector 1 is connected to a pipe 17 for supplying combustion air to the space between collector electrode 7 and burner nozzle 6. Finally, there is also provided a catalytic igniter 18 in detector 1.

The inlet for driving gas to ejector 3 is over a conduit 19 containing a valve 20 coupled to a container 21 for liquefied carbon dioxide. As clearly appears from the drawing, the hydrogen gas container 13 is also connected to the catalytic burner 4 by means of a conduit 22 containing a valve 23. Burner 4 is mounted in chamber 2 by means of a sheet metal bracket 24 fixed to the lower end of detector 1.

The cylindrical chamber 2 is completely open at its lower end. Laterally said chamber is surrounded by a cylindrical wall comprising two concentrical metal tubes 25 and 26, preferably of aluminum, and a filling 27 of glass fibre wool or similar heat-insulating material provided in the annular space between said tubes. At its upper end chamber 2 is confined by a circular cover 28 which by means of screws 29 is held on a suitable adjustable distance above the upper end surface of the side wall. Hereby an annular slot is formed between cover 25 and the upper end of the cylindrical wall whereby chamber 2 will receive a chimney function. Cover 25 is further provided with an opening through which the inlet conduits of the detector extend.

Below the function of the apparatus above described will be explained in greater detail.

By means of ejector 3 a vacuum, for instance in the order of about 1,200 mm. $H_2O$, is obtained in detector 1. Due to this vacuum a continuous flow of the gas to be analysed will be caused to pass to the detector through inlet 15 at the same time as a continuous flow of combustion air is sucked through pipe 17. Hydrogen gas will be supplied to burner nozzle 6 from container 13 through conduit 12 due to the over-pressure existing in said container. The catalytic igniter 18 will function so as to cause an automatic ignition of the mixture of hydrogen gas, combustion air and sample gas flowing into the detector chamber. Contrary to an electric igniter the catalytic igniter has the advantage that it does not require any control signal to start the combustion in the detector chamber. The catalytic igniter 18 will also if the flame is blown out during a test period cause an automatic reignition of the gas mixture whereby the need for supervision of the flame will be eliminated. Igniter 18 can suitably have the shape of a frame in which a small pellet of catalytic material or a suitable carrier pellet containing platina is mounted by means of thin platinum wires. Said pellet can be provided with a central bore through which the wires extend. When the mixture of hydrogen gas and combustion air reaches the igniter said pellet will be heated and the heat thus generated will be conducted to the thin platinum wires which also will become catalytically active and contribute to the ignition of the gas mixture. When the ignition has taken place and the combustible gas mixture is burning with a flame the igniter pellet will stop glowing as all combustible gas will be consumed in the flame. The reactive pellet can according to the invention preferably consist of a platinum sponge, platinum asbestos or palladium asbestos.

During the combustion of the gas mixture in the detector the organic substances contained in the sample gas will be vapourized and form ions making the gas mixture in the detector electrically conductive. This facilitates a measurement of the contents of organic substances in gas or particle form in the sample gas through measuring the electric conductivity of the gas mixture in the detector by means of the instrument 10 connected between the collector electrode 7 and the detector casing 5. The ejector pump 3 which, as mentioned above, is driven by carbon dioxide from container 21 will function so as to guarantee a constant non-pulsating flow of sample gas through the container 1 thereby eliminating the risk of fluctuations of the kind appearing when using electric suction pumps.

The intake 17 for combustion air should suitably be provided with a filler eliminating the risk that any organic substances will be introduced into the detector by the combustion air. Moreover, a valve-controlled conduit may be provided between the air intake and the sample gas intake 15 to facilitate a calibration of the instrument by means of filtered air.

The purpose of the catalytic heater 4 is, on the one hand, to eliminate the risk for condensation within the detector 1 and within ejector 3, and on the other hand, to ensure constant temperature conditions in said devices. In order to avoid condensation in the detector or in the ejector at the beginning of a test cycle the temperature should be kept at least at 65° C. Further, the temperature of the detector casing should not be permitted to vary more than ±1° C. as temperature variations of a higher magnitude would cause changes in the flow through the detector and thereby introduce an inaccuracy in the measurement result.

Burner 4 is, as mentioned above, adapted to be supplied with hydrogen gas from container 13. The required catalytic mass can suitably consist of platinum asbestos disposed in the conical portion of the burner and covered by means of a semispherical net. Due to the fact that burner 4 bases its function on a catalytic combustion instead of on flame combustion the burner will cause a constant heat generation and eliminate the risk for the formation of an explosive gas mixture in the apparatus if the flame should be blown out. Further, the catalytic burner also has the advantage of causing an automatic ignition without any specific control thereof. The bracket 24 for the burner 4 is designated so as to form a radiation protection preventing local heating of the ejector or the detector. The inner tube 25 of the casing of chamber 2 can suitably be polished on its inner surface to be able to function as a heat reflector. For keeping the temperature in chamber 2 at a constant value valve 23 can be manually controlled. However, it may be preferred to provide the apparatus with automatic control means arranged to adjust said valve in response to the temperature in chamber 2.

A prototype of the apparatus has been successfully tested. This prototype has a total weight of 23 kilograms, including the weight of the required gas containers. With the selected capacity of the gas continers the maximum operating time is 35 hours. This weight of the prototype should be compared with weight of about 350 kilograms of a similar apparatus having the required energy for the heater and suction pump delivered from electric accumulators. The prototype has been found to have sensitivity for hydrocarbon compounds amounting to about $0.30 \cdot 10^{-4}$ $\mu$a. per gram atom carbon$\cdot 10^{-7} \cdot$litre$^{-1}$.

What we claim is:

1. An apparatus for the quantitative analysis of a volume of gas comprising in combination
    (a) an ionization detector having a gas inlet and a gas outlet,
    (b) a suction means associated with the outlet of said ionization detector and arranged to establish a vacuum in the ionization detector to thus cause a flow of gas therethrough,
    (c) said suction means comprising a gas ejector,
    (d) a heating chamber surrounding said detector and suction means so as to maintain the ambient temperature of said detector and said suction means at a suitable level, and
    (e) a catalytic gas burner disposed within said heating chamber for supplying heat to said heating chamber.

2. An apparatus according to claim 1 characterized in that said gas ejector is arranged to be supplied with carbon dioxide as driving gas.

3. An apparatus according to claim 1 characterized in that the catalytic gas burner is arranged to be supplied with hydrogen gas.

4. An apparatus according to claim 1 wherein said detector is a flame ionization detector, characterized in that the detector is provided with a catalytic igniter.

5. An apparatus according to claim 4 characterized in that the flame ionization detector is arranged to be supplied with hydrogen gas for combustion therein.

References Cited
UNITED STATES PATENTS

| | | | |
|---|---|---|---|
| 3,432,272 | 3/1969 | Emich | 23—254 |
| 3,442,086 | 5/1969 | Nieman | 417—158 |

JOSEPH SCOVRONEK, Primary Examiner

E. A. KATZ, Assistant Examiner

U.S. Cl. X.R.

23—253 PC